United States Patent
Hwang et al.

[11] Patent Number: 6,034,185
[45] Date of Patent: Mar. 7, 2000

[54] EPOXY RESIN COMPOSITION CONTAINING POLYALKYL PHENOL RESINS AND/OR POLYALKYL PHENOL EPOXY RESINS

[75] Inventors: Kuen-Yuan Hwang; Hong-Hsing Chen; Biing Lu Perng; Shang Wen Chen, all of Hsinchu Industrial District, Taiwan

[73] Assignee: Chang Chun Plastics Co., Ltd., Taipei, Taiwan

[21] Appl. No.: 08/944,818

[22] Filed: Oct. 6, 1997

[30] Foreign Application Priority Data

Apr. 9, 1997 [TW] Taiwan .................................. 86104484

[51] Int. Cl.[7] .................................................. C08G 65/48
[52] U.S. Cl. ............................ 525/396; 525/534; 528/88; 528/92
[58] Field of Search ...................... 525/396, 534, 525/482; 549/543, 544, 545, 546, 547, 517, 555; 528/86, 88, 92, 212, 217

[56] References Cited

U.S. PATENT DOCUMENTS

| | | | |
|---|---|---|---|
| 3,247,262 | 4/1966 | Kaeding | .................................. 260/620 |
| 5,374,365 | 12/1994 | Lawson | .................................. 252/51.5 |

FOREIGN PATENT DOCUMENTS

| | | |
|---|---|---|
| 193206 | 10/1979 | China . |
| 268956 | 3/1983 | China . |
| 272981 | 6/1983 | China . |
| 58-198526 | 11/1983 | Japan . |
| 63-22824 | 1/1988 | Japan . |
| 64-65116 | 3/1989 | Japan . |
| 6-204360 | 7/1994 | Japan . |
| 7-242719 | 9/1995 | Japan . |

OTHER PUBLICATIONS

Rodriguez, principles of Polymer Systems, McGraw–Hill, p. 439, 1982.

*Primary Examiner*—Robert Dawson
*Assistant Examiner*—D. Aylward
*Attorney, Agent, or Firm*—Arnold White & Durkee

[57] ABSTRACT

This invention relates to an epoxy resin composition which comprises polyalkyl phenol resins or polyalkyl phenol epoxy resins or both, wherein the polyalkyl phenol resins are represented by formula (I):

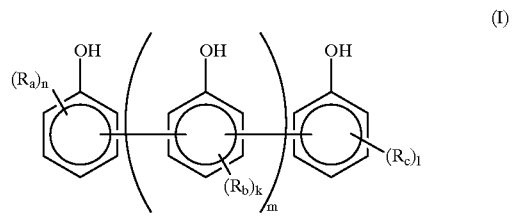

(I)

wherein Ra, Rb and Rc may be the same or different from each other and stand for $C_{1-5}$ alkyl styryl or halogen respectively;

n is an integer of 0 to 4;
k is an integer of 0 to 3;
l is an integer of 0 to 4; and
m is an integer of 1 to 10;

and the polyalkyl phenol epoxy resins, which are obtained by reacting polyalkyl phenol resins of formula (I) with epihalohydrins, are represented by formula (II):

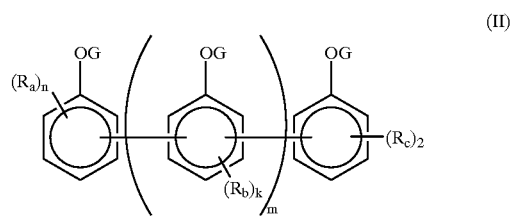

(II)

wherein G stands for

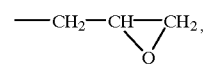

while the other symbols are the same as those defined above. The epoxy resin composition of this invention is able to provide a reactivity at lower temperatures and provide lower viscosity when used as hardener resins, as compared with traditional phenolic novolacs. Excellent molding properties and excellent stress resistance in soldering are obtained accordingly when such composition is used in electronic packaging.

15 Claims, No Drawings

EPOXY RESIN COMPOSITION CONTAINING POLYALKYL PHENOL RESINS AND/OR POLYALKYL PHENOL EPOXY RESINS

CROSS-REFERENCE TO RELATED APPLICATIONS

This application claims foreign benefit to an Taiwan Patent application filed on Apr. 9, 1997 entitled "AN EPOXY RESIN COMPOSITION CONTAINING POLYALKYL PHENOL RESINS AND/OR POLYALKYL PHENOL EPOXY RESINS" to Kuen Yuan Hwang, Hong-hsing Chen, Biing-Lu Perng and Shang-Wen Chen with Serial No. 86104484.

BACKGROUND OF THE INVENTION

Electronic components such as chips are generally encapsulated with an epoxy resin composition. For example, the packaging of diodes, transistors and integrated circuits is constructed by such composition. This kind of composition usually consists of epoxy resins, hardeners, curing promoters, fillers and other additives. Conventionally, a composition of this kind is made of o-cresol phenolic novolac epoxy resin and phenolic novolac phenol resin which bear excellent heat resistance and moisture absorption resistance after curing. However, when density of integrated circuits has continuously increased, the traditional packaging assembly units of dual in-line package (DIP) are gradually replaced by quad flat package (QFP), thin QFP (TQFP), small outline package (SOP), thin SOP (TSOP), plastic leadless chip carrier (PLCC) package or ball grid array (BGA) package of big chips and surface adhesion technology.

Packaging encapsulants may undergo temperatures higher than 260° C. when these small and thin packages are surface-adhered on circuit boards. Stress-rupture caused by the mismatch of thermal expansion and by moisture absorption may break the circuit of integrated circuits A more reliable resin composition is therefore demanded to encapsulate big chips by the package of smaller size and thinner thickness.

Efforts have generally been made for packaging encapsulants with directions: (1) to decrease the modulus of elasticity, (2) to decrease the coefficient of thermal expansion, (3) to increase the impact strength, (4) to decrease the moisture absorption rate, and (5) to increase the glass transition temperature, in order to solve the above mentioned problems. Consequently, the resin is demanded to have lower viscosity, good moldability, lower moisture absorption and high glass transition temperature after curing.

A conventional packaging encapsulant for semiconductors in the past was made mostly from raw materials of o-cresol phenolic novolac epoxy resin, phenolic novolac resin, filer, etc. These raw materials are ground, mixed, annealed, cooled, pulverired and granulated. However, most traditional resins can no longer meet the requirements of thin packaging of semiconductors.

At present, an epoxy resin composition for thin packaging has been available on the market. Generally, hardeners of biphenyl epoxy, naphthalol epoxy and phenolic resins with lower moisture absorption are primarily ed, for example, as those disclosed in Chinese Patent Publication No.272981; in Japanese Patent Unexamined Publication Sho-64-65116; and in Japanese Patent Unexamined Publication Hei-6-204360. The amount of the filler can be increased so as to reduce the inner stress caused by the mismatch of thermal expansion when these materials are used. However, drawbacks such as increased elastic moduli and reduced moldabilites of these materials may result from the increased amount of filler in the composition to reduce the moisture abortion.

In view of the aforementioned present drawbacks of related materials, the inventors have intensively studied the material for the epoxy resin composition, which comprises polyalkyl phenol resins or polyalkyl phenol epoxy resins or both, with improved properties for use in a thin packaging of semiconductors. As a result of these studies, they have completed this invention.

OBJECT OF THE INVENTION

One object of this invention is to provide an epoxy resin composition contaning polyalkyl phenol resins.

Another object of this invention is to provide an epoxy resin composition containing polyalkyl phenol epoxy resins.

Still another object of this invention is to provide an epoxy resin composition containing both polalkyl phenol resins and polyalkyl phenol epoxy resins.

DETAILED DESCRIPTION OF THE INVENTION

The first object of this invention is to provide an epoxy resin composition which comprises polyalkyl phenol resins, wherein the polyalkyl phenol resins are those represented by formula (I):

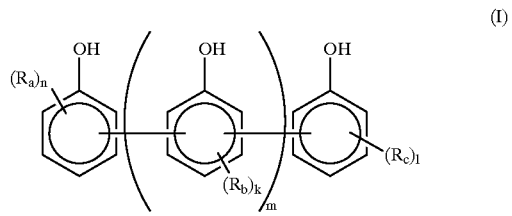

wherein $R_a$, $R_b$ and $R_c$ may be the same or different from each other and stand for $C_{1-5}$ alkyl, styryl or halogen respectively;

n is an integer of 0 to 4;

k is an integer of 0 to 3;

l is an integer of 0 to 4; and m is an integer of 1 to 10.

Polyalkyl phenol resins (I) are used as a hardener in the epoxy resin composition as the first object of this invention. They can be used alone or mixed together with hardeners of other epoxy resins. These mentioned other hardeners comprise primarily generic polymers having a phenolic hydroxy group. Examples include phenolic novolac, cresol phenolic novolac, cyclopentadiene-modified phenolic resin, a copolymer of cyclopentadiene-modified phenolic resin with phenolic novolac or cresol phenolic novolac, p-xylene-modified phenolic resin and naphthalolic resin. The amount of polyalkyl phenol resins used is from 20 to 100% by weight of the total amount of the hardeners, while in the epoxy resin composition, the content of the hardeners is from 3 to 20% by weight of the whole epoxy resin composition.

In the epoxy resin composition of the first object of this invention, the polyalkyl phenol resin (I) used as a hardener is preferably the polyalkyl phenol resin represented by formula(V):

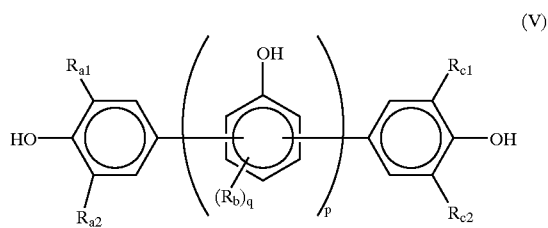

(V)

wherein $R_{a1}$, $R_{a2}$, $R_{c1}$, and $R_{c2}$ may be the same or different from each other and stand for hydrogen atom, $C_{1-5}$ alkyl styryl or halogen respectively;

$R_b$ is as defined above;

p is an integer of 1 to 10; and q is an integer of 0 to 3.

Most preferably, the polyalkyl phenol resin is the compound of formula (VI):

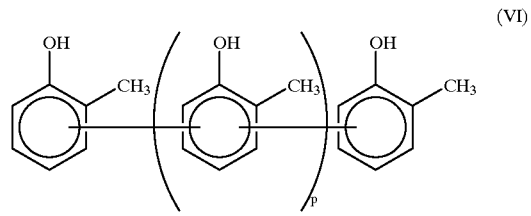

(VI)

wherein p is as defined above.

The polyalkyl phenol resin is produced by biphenylation of phenolic compounds in the presence of an oxidant (such as oxygen or hydrogen peroxide) and a coupling catalyst (such as copper compounds or quaternary ammonium salts). The bonding position can be ortho- or para-position relative to a hydroxy group.

The polyalkyl phenol resin of this invention to be used as a hardener has a lower viscosity compared to traditional resins of this kind. The reason is that the polyalkyl phenol resin of this invention is bonded by biphenylation so that its structure is different from those of traditional epoxy resin hardeners. In the latter, there are alkylene groups between bezene rings.

The viscosity of the polyalkyl phenol resin is only a few poises at molding temperature (e.g., from 165 to 185° C.) when the polyalkyl phenol resin of this invention is used as a hardener. It is lower as compared with traditional resins. The viscosity of the epoxy resin composition containing this polyalkyl phenol resin can accordingly be decreased significantly, and the amount of the filler in the epoxy composition can therefore be increased significantly.

The polyalkyl phenol resin used as a hardener in the composition of this invention is structurally biphenyl-formed. The impact resistance strength of the hardened article made of this composition may be increased because the bonding energy between bezene rings is higher than those of other forms. The biphenyl-structured polyalkyl phenol resin exhibits higher resistance to cracking which may result from the mismatch of thermal expansion or because of the absorption of moisture in the hardened article.

The reactivity of the polyalkyl phenol resin used in the composition of this invention is higher compared to traditional phenolic novolacs; therefore, the reaction rate is faster.

The second object of this invention is to provide a novel epoxy resin composition which comprises polyalkyl phenol epoxy resins, wherein the polyalkyl phenol epoxy resins are represented by formula (II):

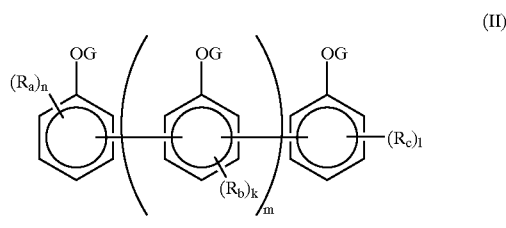

(II)

wherein G stands for

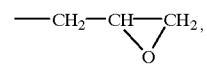

the other symbols are the same as those defined above.

The polyallyl phenol epoxy resin is obtained as an adduct by subjecting the polyalkyl phenol resin of formula (I) to an addition reaction with an epihalohydrin in the presence of an alkali metal catalyst.

The polyalkyl phenol epoxy resin (II) is used as an epoxy resin component in the epoxy resin composition of the second object of this invention. It can be used alone or in combination with other convention1 epoxy resins. These other conventional epoxy resins may be, for example, biphenylic epoxy resins represented by the following formula (III), o-cresol phenolic novolacs and phenolic dicyclopentadiene novolac epoxy resins represented by formula (IV):

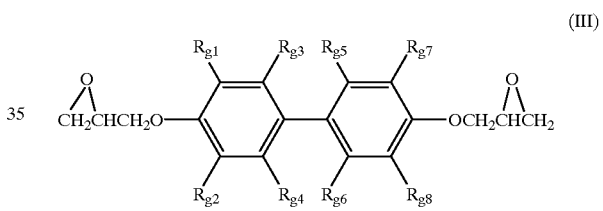

(III)

wherein $R_{g1}$–$R_{g8}$ are the same or different from each other and stand for H, F, Cl, Br, I or $C_1$~$C_5$ alkyl group,

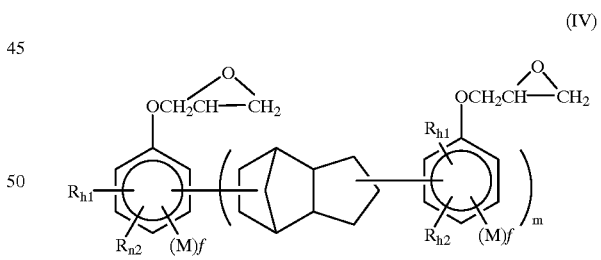

(IV)

wherein $R_{h1}$–$R_{h2}$ are the same or different from each other and stand for H or $C_1$~$C_5$ alkyl; M=F, Cl, Br, m>1; f=0,1,2.

In the epoxy resin composition of the second object of this invention, the amount of the polyalkyl phenol epoxy resin (II) used as an epoxy resin component is from 30 to 100% by weight of the total amount of epoxy resin components in the composition, while in the composition, the total amount of epoxy resin components is from 5 to 20% by weight of the whole epoxy resin composition.

In the epoxy resin composition of the second object of this invention, the polyalkyl phenol epoxy resin (II) used as an epoxy resin component is preferably the polyalkyl phenol epoxy resin represented by formula (VII):

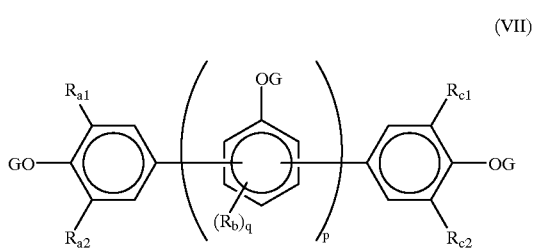

(VII)

wherein $R_{a1}$, $R_{a2}$, $R_{c1}$ and $R_{c2}$ may be the same or different from each other and stand for hydrogen atom, $C_{1-5}$ alkyl styryl or halogen;

$R_b$ and G are as defined above;

p is an integer of 1 to 10; and q is an integer of 0 to 3.

Most preferably, the polyalkyl phenol epoxy resin is the compound of formula (VIII):

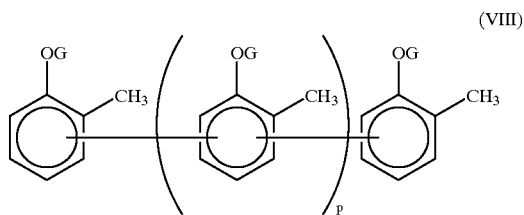

(VIII)

wherein p and G are as defined above.

The third object of this invention is to provide a novel epoxy resin composition which comprises both polyalkyl phenol resins and polyalkyl phenol epoxy resins, wherein the polyallyl phenol resins are those represented by the above mentioned formula (I), and the polyalkyl phenol epoxy resins are those represented by the above mentioned formula (II).

The polyalkyl phenol resin (I) is used as a hardener in the epoxy resin composition of the third object of this invention. It can be used alone or in combination with hardeners of other epoxy resins. The amount of the polyallyl phenol resins used is from 20 to 100% by weight of the total amount of the hardeners; while in the epoxy resin composition, the content of the hardeners is from 3 to 20% by weight of the whole epoxy resin composition.

The polyalkyl phenol epoxy resin (II) is used as an epoxy resin component in the epoxy resin composition of the third object of this invention. It can be used alone or in combination with other conventional epoxy resins as mentioned above. The amount of the polyalkyl phenol epoxy resin (II) is from 30 to 100% by weight of the total amount of epoxy resin components in the composition; while in the composition, the content of the epoxy resin components is from 5 to 20% by weight of the whole epoxy resin composition.

Since each one of the epoxy resin compositions of the first to the third object of this invention comprises polyalkyl phenol resins of formula (I) or polyalkyl phenol epoxy resins of formula (II) or both and has a lower viscosity than traditional hardeners and traditional epoxy resins, the content of the filler in the composition can be increased. The article made of the epoxy resin compositions of this invention, because of the unique structure mentioned above, has significantly improved properties such as a higher impact resistance strength and a higher heat resistance. As a result, problems of cracking or delamination caused by thermal impact during soldering can be eliminated.

The article made of the epoxy resin composition of the first to the third object of this invention exhibits lower elasticity at high temperatures. Thus the composition can be used for packaging semiconductor assemblies which withstand heat of soldering without cracking, to ensure an excellent reliability of the semiconductor assemblies.

The epoxy resin composition of this invention may comprise conventional fillers. The types of fillers are not particularly limited. They can be, for example, inorganic fillers such as silica powder including a spherical or an angular type of molten silica, crystaline silica, etc., quartz glass powder, talc powder, alumina powder, calcium carbonate powder and the like. Among them, angular molten silica, crystalline silica, or the mixture of angar molten silica and spherical molten silica are preferred. The content of the filler is from 60 to 92% by weight of the whole epoxy resin composition.

The epoxy resin composition of this invention may further comprise a curing promoter. The curing promoter used can be any promoter which promotes the reaction between an epoxy group and a hydroxy group. Curing promoters generally employed in sealing compounds can also be used. Examples are diazabicycloundecene (DBU), triphenylphosphine (TPP), benydimethylamine (BDMA) and 2-methylimidazole (2-MZ). These curing promoters can be used alone or in combination. The amount used is 0.05 to 1% by weight of the whole epoxy resin composition.

The epoxy resin composition of this invention may optionally comprise other additives such as silane coupling agents, flame retardants (e.g. broninated epoxy resin and antimonous oxide), coloring agents (carbon black and ferric oxide), mold-release agents and stress-relief additives, besides essential ingredients of epoxy resin components, hardeners, fillers and curing promoters.

The epoxy resin composition of this invention can be obtained by thoroughly blending and annealing the above mentioned epoxy resin components, hardeners, fillers, curiny promoters and other optional additives in a blender and pulverizing them by any conventional method known to the art.

The epoxy resin composition of this invention exhibits excellent stress resistance in soldering which cannot be achieved by traditional epoxy resins. A semiconductor of integrated circuits encapsulated by such epoxy resin composition therefore will have excellent crack resistance, while encountering sudden change of high temperature of the solder during the soldering process. The shelf life of semiconductor components can be significantly extended.

The present invention will be further described but by no means be limited by the following examples, comparative examples and test examples.

EXAMPLE 1

The following ingredients were blended thoroughly in a blender and the reaction state was then analyzed with a differential scanning calorimeter (DSC):

| | |
|---|---|
| o-Cresol phenolic novolac epoxy resin (softening point 65° C., epoxy equivalents 200 g/eq) | 11.2 parts by weight |
| Poly-o-cresol resin of formula (VI) (softening point 89° C., hydroxy equivalents 117 g/eq) | 6.02 parts by weight |
| Triphenylphosphine | 0.26 parts by weight |

About 10 mg of the resulting formulation was taken, and the reaction state was tested by DSC at an elevating temperature rate of 20° C./min. The result is shown in Table 1.

EXAMPLES 2 AND 3

Blending and testing were carried out according to the same manner as in Example 1, but the composition shown in Table 1 was employed. The testing result is shown in Table 1.

COMPARATIVE EXAMPLES 1 AND 2

Blending and testing were carried out according to the same manner as in Example 1, but the composition shown in Table 1 was employed. The testing result is shown in Table 1.

After the above raw materials were blended and annealed thoroughly in a blender, the mixture was cooled and pulvenrized to obtain the epoxy resin composition.

TABLE 1

|  | Example 1 | Example 2 | Example 3 | Comparative Example 1 | Comparative Example 2 |
|---|---|---|---|---|---|
| Formula |  |  |  |  |  |
| Phenolic novolac | — | 3.01 | 3.01 | 6.02 | 6.02 |
| Poly-o-cresol resin of formula (VI) | 6.02 | 3.01 | 3.01 | — | — |
| o-Cresol phenolic novolac epoxy resin | 11.22 | 11.22 | — | 11.22 | — |
| Biphenyl epoxy resin of formula (III)* | — | — | 11.22 | — | 11.22 |
| Triphenylphosphine | | | 0.26 | | |
| Reaction State |  |  |  |  |  |
| Initial temperature | 128 | 138 | 143 | 146 | 150 |
| Peak temperature | 155 | 168 | 175 | 184 | 190 |
| Gelling time (sec.) | 24 | 25 | 26 | 28 | 30 |

*wherein $R_{g1}$, $R_{g2}$, $R_{g7}$ and $R_{g8}$ are methyl group, other symbols are hydrogen atoms.

It is known from comparisons in Table 1 that, when the polyallyl phenol resin of this invention is used as a hardener, both the initial temperature and the peak temperature of the reaction are lower than those when hardener of traditional resins are used so the former has an excellent reactivity at lower temperatures.

EXAMPLE 4 o-Cresol phenolic novolac epoxy resin (softening point 65° C.,

| | |
|---|---|
| o-Cresol phenolic novolac epoxy resin (softening point 65° C., epoxy equivalents 200 g/eq) | 11.22 parts by weight |
| Phenolic novolac resin | 3.01 parts by weight |
| Poly-o-cresol resin of formula (VI) (softening point 89° C., hydroxy equivalents 117 g/eq) | 3.01 parts by weight |
| Silane coupling agent | 0.60 parts by weight |
| Triphenylphosphine | 0.26 parts by weight |
| Molten silica | 80.0 parts by weight |
| Carbon black | 0.30 parts by weight |
| Carnauba wax | 0.60 parts by weight |

EXAMPLES 5 to 13 AND COMPARATIVE EXAMPLES 3 AND 5

Blending and annealing were carried out according to the same manner as in Example 4, but the ingredients and compositions shown in Table 2 were employed to obtain the epoxy resin compositions.

TEST EXAMPLES

The characters of the samples obtained in the above Examples 5 to 13 and Comparative Examples 3 to 5 were analyzed by the following analytical methods and the excellent properties were identified. The results are listed in Table 2.

TABLE 2

|  | Unit | Example 5 | Example 6 | Example 7 | Example 8 | Example 9 | Example 10 | Example 11 | Example 12 | Example 13 | Comparative Example 3 | Comparative Example 4 | Comparative Example 5 |
|---|---|---|---|---|---|---|---|---|---|---|---|---|---|
| Phenolic novolac |  | 4.02 | 3.01 | 2.00 | 1.77 | 1.42 | — | — | 4.27 | 6.02 | 6.02 | 4.27 | 3.61 |
| Poly-o-cresol resin of formula (VI) |  | 2.00 | 3.01 | 4.02 | 3.55 | 2.85 | 3.61 | 6.02 | — | — | — | — | — |
| Biphenyl epoxy resin of formula (III)[1] |  | — | — | — | — | 3.90 | 6.43 | — | 3.90 | — | — | 3.90 | 6.43 |
| Phenolic dicyclopentadiene novlac epoxy resin of formula (IV)[2] |  | — | — | — | — | — | — | — | — | 3.22 | — | — | — |
| Poly-o-cresol epoxy |  | — | — | — | — | — | — | 11.22 | 4.07 | 4.00 | — | — | — |

TABLE 2-continued

|  | Unit | Example 5 | Example 6 | Example 7 | Example 8 | Example 9 | Example 10 | Example 11 | Example 12 | Example 13 | Comparative Example 3 | Comparative Example 4 | Comparative Example 5 |
|---|---|---|---|---|---|---|---|---|---|---|---|---|---|
| resin of formula (VIII) |  |  |  |  |  |  |  |  |  |  |  |  |  |
| o-Cresol phenolic novolac epoxy rsin |  | 11.22 | 11.22 | 11.22 | 9.92 | 4.07 | — | — | — | — | 11.22 | 4.07 | — |
| Triphenylphosphine |  | 0.26 | 0.26 | 0.26 | 0.26 | 0.26 | 0.26 | 0.26 | 0.26 | 0.26 | 0.26 | 0.26 | 0.26 |
| Silane coupling agent |  | 0.60 | 0.60 | 0.60 | 0.60 | 0.60 | 0.60 | 0.60 | 0.60 | 0.60 | 0.60 | 0.60 | 0.60 |
| Molten silica |  | 80.00 | 80.00 | 80.00 | 82.00 | 85.00 | 87.00 | 80.00 | 85.00 | 85.00 | 80.00 | 85.00 | 87.00 |
| Carbon Black |  | 0.30 | 0.30 | 0.30 | 0.30 | 0.30 | 0.30 | 0.30 | 0.30 | 0.30 | 0.30 | 0.30 | 0.30 |
| Carnauba wax |  | 0.60 | 0.60 | 0.60 | 0.60 | 0.60 | 0.60 | 0.60 | 0.60 | 0.60 | 0.60 | 0.60 | 0.60 |
| Spiral flow | cm | 58 | 68 | 75 | 68 | 67 | 74 | 84 | 63 | 61 | 50 | 27 | 44 |
| Viscosity of products (175° C.) | poise | 108 | 83 | 80 | 67 | 67 | 60 | 55 | 65 | 67 | 123 | 265 | 120 |
| Flexural Strength | Kg/mm$^2$ | 14.3 | 14.5 | 14.5 | 14.6 | 14.7 | 149 | 14.7 | 13.6 | 13.5 | 13.5 | Cannot be molded | poorly molded |
| Elasticity (250° C.) | G.Pa | 0.184 | 0.165 | 0.152 | 0.179 | 0.214 | 0.233 | 0.150 | 0.182 | 0.187 | 0.233 |  |  |
| Impact of heat resistance after moisture absorption$^3$ |  | 6/12 | 4/12 | 3/12 | 1/12 | 0/12 | 0/12 | 0/12 | 0/12 | 1/12 | 12/12 |  |  |

$^1$where $R_{g1}$, $R_{g2}$, $R_{g7}$ and $R_{g8}$ are methyl groups, other symbols are hydrogen atoms.
$^2$where $R_{h1}$ is methyl, $R_{h2}$ is hydrogen and $f = 0$.
$^3$# of delaminated failures/# of total samples.

(1) Spiral Flow Test

A 17-g sample was molded by 75-ton transfer molding press in a spiral flow measuring die, under molding pressure of 30 kg/cm$^2$ and molding temperature of 175° C. The length of molded product was measured as spiral flow value.

(2) Molten Viscosity

The flowability of samples was determined by a capillary flow meter (pore diameter: 0.5 mm, pore depth: 1 mm) under pressure of 5 kg/cm$^2$ and molding temperature of 175° C.

(3) Flexural Strength

The flexural strength of samples was tested according to the method of ASTM-D790.

(4) Elasticity

The elasticity was analyzed by a dynamic thermal analyzer of TA-Instrument at an operating temperature of 40 to 270° C.

(5) Impact of Heat Resistance after 48 hours of Moisture Absorption

The products were encapsulated by dual in-line package with 28 lines and postcured at 175° C. After 48 hours of moisture absorption in a 100% pressure cooker at 121° C., the packaged products were dipped in tin-soldering tank for 10 seconds, and the inner-delaminated failures were detected and counted by scanning acoustic tomography.

Compositions with lower viscosity are obtained in Examples 5 to 10 of Table 2 when the polyalkyl phenol resin of this invention is employed as a hardener. Higher impact strength and lower elasticity at high temperatures are also provided in these compositions. The amount of the filler in the epoxy composition can be increased as a result of decreasing viscosity; and the reliability of the package may be highly improved by increasing impact strength and decreasing elasticity.

The viscosity of the epoxy resin composition can be decreased in Examples 11 and 12 when the polyalkyl phenol epoxy resin of this invention is employed as epoxy resin component. Meanwhile, higher impact strength and lower elasticity at high temperatures are also obtained. The reliability of the package therefore may highly be improved.

The epoxy resin compositions, which comprise polyalkyl phenol resins or polyalkyl phenol epoxy resins in Examples 5 to 7 and 11 of this invention, exhibit excellent elasticities and heat resistance to soldering as compared with Comparative Example 3 which contains a conventional epoxy resin composition and the same amount of the filler as 80%.

What is claimed:

1. An epoxy resin composition comprising an epoxy resin and a hardener of polyalkyl phenol resins, wherein said polyalkyl phenol resins are represented by formula (I):

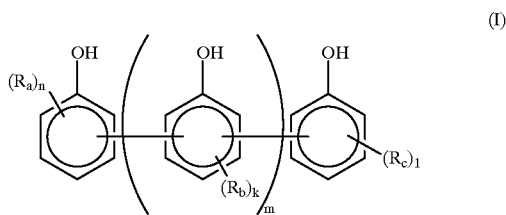

wherein $R_a$, $R_b$ and $R_c$ may be the same or different from each other and stand for $C_{1-5}$ alkyl, styryl or halogen respectively;

n is an integer of 0 to 4;

k is an integer of 0 to 3;

l is an integer of 0 to 4; and m is an integer of 1 to 10.

2. The epoxy resin composition according to claim 1, wherein said polyalkyl phenol resins are used as a hardener, and wherein hardeners of other epoxy resins can further be included, and the amount of said polyalkyl phenol resins of formula (I) used is from 20 to 100% by weight of the total amount of the hardeners, while the total amount of the hardeners is from 3 to 20% by weight of the whole epoxy resin composition.

3. The epoxy resin composition according to claim 1, wherein said polyalkyl phenol resins are polyaklyl phenol resins represented by formula (V):

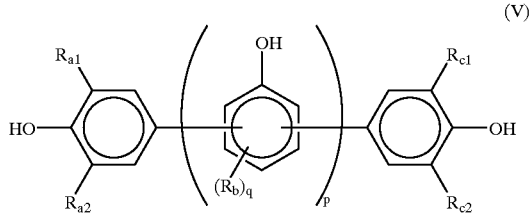

(V)

wherein $R_{a1}$, $R_{a2}$, $R_{c1}$ and $R_{c2}$ may be the same or different from each other and stand for hydrogen atom, $C_{1-5}$ alkyl styryl or halogen respectively;

$R_b$ is as defined in claim 1;

p is an integer of 1 to 10; and q is an integer of 0 to 3.

4. The epoxy resin composition according to claim 1, wherein said polyalkyl phenol resins are poly-o-cresol resins represented by formula (VI):

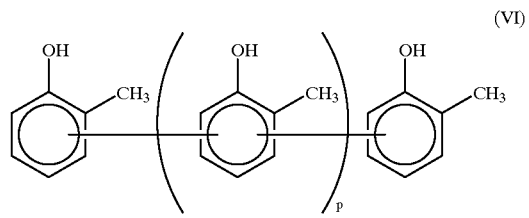

(VI)

wherein p is an integer of 1 to 10.

5. An epoxy resin composition comprising polyalkyl phenol epoxy resins, wherein said polyalkyl phenol epoxy resins are represented by formula (II):

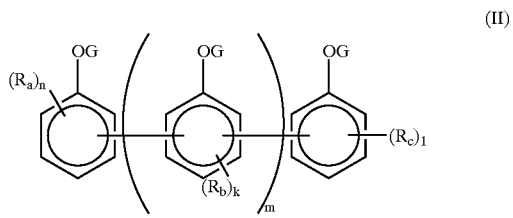

(II)

wherein G stands for

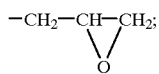

$R_a$, $R_b$ and $R_c$ may be the same or different from each other and stand for $C_{1-5}$ alkyl, styryl or halogen respectively;

n is an interger of 0 to 4;

k is an interger of 0 to 3;

l is an interger of 0 to 4; and m is an interger of 1 to 10.

6. The epoxy resin composition according to claim 5, wherein said polyalkyl phenol epoxy resins are used as an epoxy resin component, and wherein components of other epoxy resins can further be included, and the amount of said polyalkyl phenol epoxy resins of formula (II) used is from 30 to 100% by weight of the total amount of epoxy resin components, while the total amount of epoxy resin components is from 5 to 20% by weight of the whole epoxy resin composition.

7. The epoxy resin composition according to claim 5, wherein said polyaklyl phenol epoxy resins are polyaklyl phenol epoxy resins represented by formula (VII):

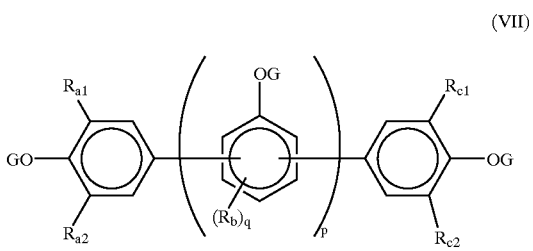

(VII)

wherein $R_{a1}$, $R_{a2}$, $R_{c1}$ and $R_{c2}$ may be the same or different from each other and stand for hydrogen atom, $C_{1-5}$ alkyl styryl or halogen respectively;

$R_b$ and G are as defined in claim 5;

p is an integer of 1 to 10; and q is an integer of 0 to 3.

8. The epoxy resin composition according to claim 5, wherein said polyalkyl phenol epoxy resins are poly-o-cresol epoxy resins represented by formula (VIII):

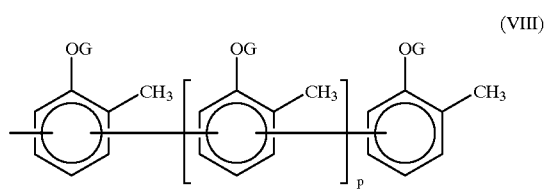

(VIII)

wherein G is as defined in claim 5 and p is an integer of 1 to 10.

9. An epoxy resin composition comprising polyalkyl phenol resins and polyalkyl phenol epoxy resins, wherein said polyalkyl phenol resins are those represented by formula (I):

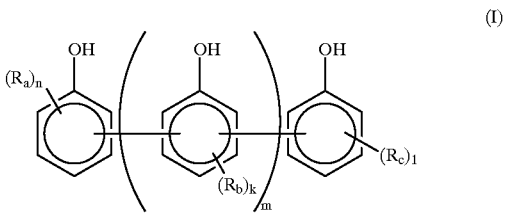

(I)

wherein $R_a$, $R_b$ and $R_c$ may be the same or different from each other and stand for $C_{1-5}$ alkyl, styryl or halogen respectively;

n is an integer of 0 to 4;

k is an integer of 0 to 3;

l is an integer of 0 to 4; and m is an integer of 1 to 10;

and said polyalkyl phenol epoxy resins are those represented by formula (II):

(II)

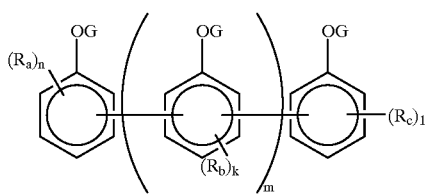

wherein G stands for

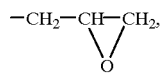

and the other symbols are the same as those defined above.

10. The epoxy resin composition according to claim 9, wherein said polyalkyl phenol resins are used as a hardener, and wherein hardeners of other epoxy resins can further be included, and the amount of said polyalkyl phenol resins of formula (I) used is from 20 to 100% by weight of the total amount of the hardeners, while the total amount of the hardeners is from 3 to 20% by weight of the whole epoxy resin composition.

11. The epoxy resin composition according to claim 9 or 10, wherein said polyalkyl phenol epoxy resins are used as an epoxy resin component, and wherein components of other epoxy resins can further be included, and the amount of said polyalkyl phenol epoxy resins of formula (II) used is from 30 to 100% by weight of the total amount of epoxy resin components, while the total amount of epoxy resin components is from 5 to 20% by weight of the whole epoxy resin composition.

12. The epoxy resin composition according to claim 9, wherein said polyalkyl phenol resins are polyaklyl phenol resins represented by formula (V):

(V)

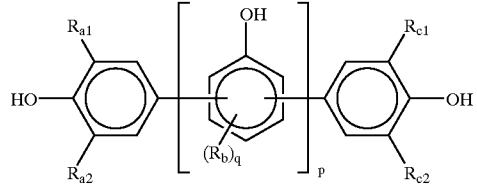

wherein $R_{a1}$, $R_{a2}$, $R_{c1}$ and $R_{c2}$ may be the same or different from each other and stand for hydrogen atom, $C_{1-5}$ alkyl, styryl or halogen respectively;

$R_b$ is as defined in claim 9;

p is an integer of 1 to 10; and q is an integer of 0 to 3.

13. The epoxy resin composition according to claim 9, wherein said polyalkyl phenol resins are poly-o-cresol resins represented by formula (VI):

(VI)

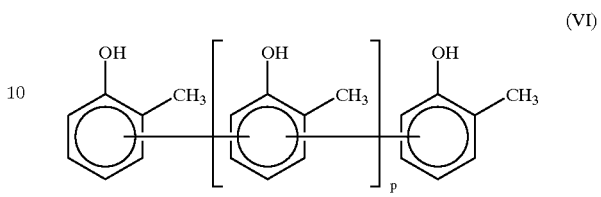

wherein p is an integer of 1 to 10.

14. The epoxy resin composition according to claim 9, wherein said polyalkyl phenol epoxy resins are polyaklyl phenol epoxy resins represented by formula (VII):

(VII)'

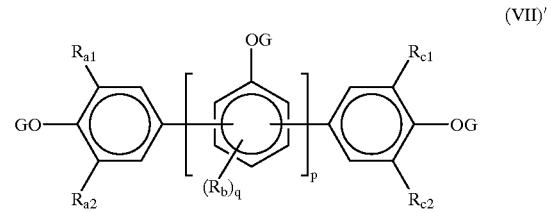

wherein $R_{a1}$, $R_{a2}$, $R_{c1}$ and $R_{c2}$ may be the same or different from each other and stand for hydrogen atom, $C_{1-5}$ alkyl, styryl or halogen respectively;

$R_b$ and G are as defined in claim 9;

p is an integer of 1 to 10; and q is an integer of 0 to 3.

15. The epoxy resin composition according to claim 9, wherein said polyalkyl phenol epoxy resins are poly-o-cresol epoxy resins represented by formula (VIII):

(VIII)

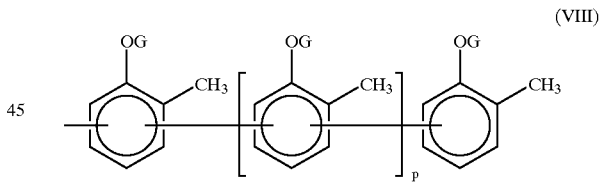

wherein G is as defined in claim 9 and p is an integer of 1 to 10.

* * * * *

UNITED STATES PATENT AND TRADEMARK OFFICE
CERTIFICATE OF CORRECTION

PATENT NO.   : 6,034,185
DATED        : March 7, 2000
INVENTOR(S)  : Hwang et al.

It is certified that error appears in the above-identified patent and that said Letters Patent is hereby corrected as shown below:

Column 11,
Line 15, replace "$R_b$" with "$R_2$"
Line 55, replace "Interger" with -- Integer --
Line 56, replace "Interger" with -- Integer --
Line 57, replace "Interger" with -- Integer --
Line 58, replace "Interger" with -- Integer --

Signed and Sealed this

Eighth Day of October, 2002

Attest:

JAMES E. ROGAN
Attesting Officer    Director of the United States Patent and Trademark Office